US012033495B2

(12) United States Patent
Bartkowiak

(10) Patent No.: US 12,033,495 B2
(45) Date of Patent: Jul. 9, 2024

(54) METHOD, DEVICE AND COMPUTER PROGRAM FOR A VEHICLE

(71) Applicant: Volkswagen Aktiengesellschaft, Wolfsburg (DE)

(72) Inventor: Nicolai Bartkowiak, Giesen (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 558 days.

(21) Appl. No.: 17/413,632

(22) PCT Filed: Dec. 12, 2019

(86) PCT No.: PCT/EP2019/084944
§ 371 (c)(1),
(2) Date: Nov. 19, 2021

(87) PCT Pub. No.: WO2020/120696
PCT Pub. Date: Jun. 18, 2020

(65) Prior Publication Data
US 2022/0076565 A1 Mar. 10, 2022

(30) Foreign Application Priority Data
Dec. 14, 2018 (DE) ............ 10 2018 221 740.8

(51) Int. Cl.
G08G 1/0965 (2006.01)
G08G 1/01 (2006.01)
(Continued)

(52) U.S. Cl.
CPC ......... G08G 1/0112 (2013.01); G08G 1/0116 (2013.01); G08G 1/0133 (2013.01);
(Continued)

(58) Field of Classification Search
CPC ............ G08G 1/06965; G08G 1/0112; G08G 1/0116; G08G 1/0133; G08G 1/162; B60W 40/06; H04L 9/3239; G01C 21/3691
See application file for complete search history.

(56) References Cited

U.S. PATENT DOCUMENTS 7,912,628 B2  3/2011  Chapman et al. ............ 701/117
8,666,593 B2  3/2014  Yamada ......................... 701/36
(Continued)

FOREIGN PATENT DOCUMENTS

CN  108769154 A  11/2018  ............ H04L 29/06
DE  102008020590 A1  10/2008  ............ G01C 21/26
(Continued)

OTHER PUBLICATIONS

Chinese Office Action, Application No. 201980092016.0, 25 pages.
(Continued)

Primary Examiner — Tan Q Nguyen
(74) Attorney, Agent, or Firm — Slayden Grubert Beard PLLC

(57) ABSTRACT

The present invention relates to a method, a device, and a computer program for a first vehicle. The method comprises a step of obtaining information on a state of a roadway from a second vehicle or from traffic infrastructure. The method additionally comprises a step of validating the information on the state of the roadway based on a sensor signal or a step of obtaining information on a validation of the information on the state of the roadway from one or more third vehicles. The method additionally comprises a step of determining a trustworthiness of the information on the state of the roadway based on the validation of the information on the state of the roadway and/or based on the information obtained (Continued)

from the one or more third vehicles on the validation of the information on the state of the roadway.

20 Claims, 5 Drawing Sheets

(51) Int. Cl.
    *G08G 1/0967*      (2006.01)
    *H04L 9/32*      (2006.01)
    *H04W 4/44*      (2018.01)
    *H04W 4/46*      (2018.01)
    *B60W 40/06*      (2012.01)
    *H04L 9/00*      (2022.01)

(52) U.S. Cl.
    CPC ..... *G08G 1/0141* (2013.01); *G08G 1/096725* (2013.01); *G08G 1/096783* (2013.01); *G08G 1/096791* (2013.01); *H04L 9/3239* (2013.01); *H04W 4/44* (2018.02); *H04W 4/46* (2018.02); *H04L 9/50* (2022.05); *H04L 2209/84* (2013.01)

(56) References Cited

U.S. PATENT DOCUMENTS

| | | | |
|---|---|---|---|
| 8,831,869 B2 | 9/2014 | Bai et al. | 701/301 |
| 9,159,231 B2* | 10/2015 | Noh | G08G 1/096741 |
| 2005/0149259 A1 | 7/2005 | Cherveny et al. | 701/532 |
| 2010/0250106 A1* | 9/2010 | Bai | G08G 1/096791 |
| | | | 701/117 |
| 2013/0154854 A1 | 6/2013 | Chen et al. | 340/905 |
| 2014/0195138 A1* | 7/2014 | Stelzig | G08G 1/0116 |
| | | | 701/119 |
| 2018/0061237 A1 | 3/2018 | Erickson et al. | |
| 2018/0211524 A1* | 7/2018 | Furuichi | G01C 21/3415 |
| 2018/0342036 A1 | 11/2018 | Zachary | |
| 2019/0261171 A1* | 8/2019 | Cozzetti | H04W 12/108 |
| 2019/0306677 A1* | 10/2019 | Basu | G08G 1/0112 |
| 2019/0378414 A1* | 12/2019 | Pari | G08G 1/04 |

FOREIGN PATENT DOCUMENTS

| | | | | |
|---|---|---|---|---|
| DE | 102010012402 A1 | 12/2010 | | G08G 1/0965 |
| DE | 102018112118 A1 | 11/2018 | | G60F 21/62 |
| DE | 102018221740 A1 | 6/2020 | | B60W 40/06 |
| EP | 2122598 B1 | 4/2013 | | G08G 1/0967 |
| WO | 2017/190794 A1 | 11/2017 | | G07B 15/06 |
| WO | 2020/120696 A1 | 6/2020 | | G01C 21/36 |

OTHER PUBLICATIONS

German Office Action, Application No. 102018221740.8, 7 pages.
International Search Report and Written Opinion, Application No. PCT/EP2019/084944, 26 pages.

* cited by examiner

METHOD, DEVICE AND COMPUTER PROGRAM FOR A VEHICLE

CROSS-REFERENCE TO RELATED APPLICATIONS

This application claims priority to German Patent Application No. DE 10 2018 221 740.8, filed Dec. 14, 2018 with the German Patent and Trademark Office. The contents of the aforesaid Patent Application are incorporated herein for all purposes.

TECHNICAL FIELD

The present invention relates to a method, a device, and a computer program for a first vehicle, and more specifically, but not exclusively, to a method for determining a trustworthiness of information on a state of a roadway.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A focus within automotive research is on the development of safety functions. One possible safety function is the relaying of information to other road users who may pass along the same section of road, for example information on roadworks, dirty roads, and the like, such that the other road users may bypass the compromised section of road if necessary or may pay greater attention. Since this information may potentially be provided by each road user, it is possible for false information to be relayed, for example due to erroneous measurements or due to malicious intent of a sender.

SUMMARY

A need exists to increase the reliability of data sharing between vehicles, which in turn increases trust and thus the usability of information from third parties.

The need is addressed by a method, a computer program, and a device according to the independent claims. Embodiments of the invention are described in the dependent claims, the following description, and the drawings.

DESCRIPTION

Figure 1A:
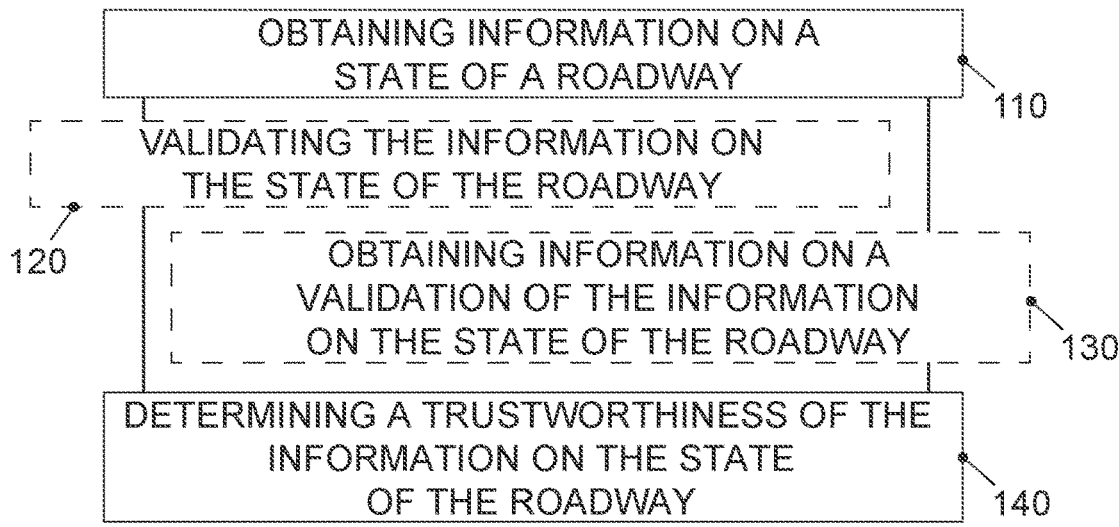
FIGS. 1a and 1b are flow diagrams of exemplary embodiments of a method for a first vehicle.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

Exemplary embodiments provide, for example, a method for a first vehicle. Said vehicle is traveling on a roadway, for example a road, and obtains information on a state of the roadway, for example that there is the risk of black ice or that there is a traffic jam at a particular point on the road, from other vehicles or from traffic infrastructure, such as a traffic light or a road sign. In order to increase the reliability of said information being correct, the vehicle awaits reports from one or more third vehicles in order to ascertain whether the initially obtained information is confirmed by the third vehicles or said third vehicles report identical information and thus indirectly confirm the initially obtained information. If this is the case, after exceeding a threshold at which the user of the first vehicle is convinced of the veracity of the information, the vehicle may be used, for example, to adapt autonomous or semi-autonomous control of the vehicle and, for example, initiate a braking procedure or alter the navigation route. If the first vehicle is already at the point described by the information on the state of the road, the method may additionally check the information on the state of the roadway based on own sensor measurements and provide the result of the check to the other network participants. In a simple implementation, the information may be exchanged directly between the vehicles and/or the traffic infrastructure, for example via vehicle-to-X communication. In some embodiments, the information is exchanged via a decentralized database, which may for example be based on distributed ledger technology, which may provide further protection against subsequent alteration of the information exchanged.

Exemplary embodiments provide a method for a first vehicle. The method comprises a step of obtaining information on a state of a roadway from a second vehicle or from traffic infrastructure. The method further comprises (either) a step of validating the information on the state of the roadway based on a sensor signal or a step of obtaining information on a validation of the information on the state of the roadway from one or more third vehicles. The method further comprises a step of determining a trustworthiness of the information on the state of the roadway based on the validation of the information on the state of the roadway and/or based on the information obtained from the one or more third vehicles on the validation of the information on the state of the roadway. This enables distributed determination of the trustworthiness of the information on the state of the roadway. The user or participant (vehicle, etc.) may then, for example, decide ad hoc whether to trust the information on the state of the roadway based on the determined trustworthiness, or they may specify in advance a threshold value for the trustworthiness from which the information on the state of the roadway is to be considered true.

The method may further comprise a step of providing information on the validation of the information on the state of the roadway by means of the first vehicle to one or more other vehicles via the decentralized database. As a result, the information on the roadway may be confirmed and denied by the first vehicle to the other vehicles, which allows the other vehicles to assess the trustworthiness of the information on the state of the roadway.

In some embodiments, the information on the state of the roadway and/or the information on the validation of the information on the state of the roadway are transmitted between the vehicles via a decentralized database. This allows for transfer between the vehicles of the information on the state of the roadway and/or the information on the validation of the information on the roadway, it being possible for additional safety and/or validation functionalities to be included herein.

For example, the decentralized database may be based on distributed ledger technology (DLT, decentrally managed account books/transaction database). The decentralized database may for example be based on directed acyclic graphs (DAG). This enables transmission of information in such a way that subsequent manipulation of the information transmitted is made more difficult or practically impossible (depending on the technology or platform chosen). If, for example, a DAG is used for this purpose, sufficient scalability of the decentralized database may be achieved. The increasing volume of data may be handled by means of technology enhancements such as (geographical) fragmentation of the network (e.g., "sharding", "economic clustering", etc.).

The method may further comprise a step of obtaining at least one part of the decentralized database based on a position of the first vehicle. This allows the first vehicle to use the relevant entries in the decentralized database at its position.

Alternatively, the information on the state of the roadway and/or the information on the validation of the information on the state of the roadway may be transmitted between the vehicles and/or the traffic infrastructure by means of direct vehicle-to-vehicle communication or indirect vehicle-to-vehicle communication. This enables determination of the trustworthiness of the information on the state of the roadway without the additional involvement of a decentralized database. However, this also entails greater susceptibility to manipulation of the information transmitted and a lower range of information dissemination.

In some embodiments, the step of determining the trustworthiness of the information on the state of the roadway is carried out by the first vehicle. This enables faster and lower-latency assessment of the trustworthiness of the information on the state of the roadway.

The method may also comprise a step of controlling the first vehicle based on the information on the state of the roadway if the trustworthiness of the information on the state of the roadway exceeds a threshold value. If the first vehicle is an autonomous or semi-autonomously controlled vehicle, the first vehicle may react to a hazardous situation on the roadway or the driving parameters may be optimized.

For example, the threshold value may be a user-selected threshold value. This allows each driver/user of the first vehicle to decide for themselves the threshold value at which they trust the information on the state of the roadway. Alternatively or additionally, the threshold value may be dependent on a type of the information on the state of the roadway. For example, the threshold value may depend on a hazard potential of the information on the state of the roadway. As such, lower threshold values may be set if an immediate reaction is required and higher threshold values if the hazard potential is less great, for example. The hazard potential may in many cases be derived from the type of the information on the state of the roadway or may be estimated based on this.

In some embodiments, the information on the validation of the information on the state of the roadway from the one or more third vehicles indicates whether the one or more third vehicles confirm the information on the state of the roadway. During determination of the trustworthiness of the information on the state of the roadway, the trustworthiness of the information on the state of the roadway may be increased if a vehicle of the one or more third vehicles confirms the information on the state of the roadway. The trustworthiness of the information on the state of the roadway may be reduced if a vehicle of the one or more third vehicles denies the information on the state of the roadway. This enables a quick assessment of the trustworthiness of the information on the state of the roadway, it being possible to implement counters for this.

The method may further comprise a step of determining a trustworthiness of the second vehicle or traffic infrastructure and/or of the one or more third vehicles based on the trustworthiness of the information on the state of the roadway. The determination of the trustworthiness of the information on the state of the roadway may be based on a previous trustworthiness of the second vehicle or traffic infrastructure and/or of the one or more third vehicles. As such, the first vehicle may for example store in a permanent memory which vehicles or traffic infrastructure have provided trustworthy messages in the past and believe the messages from said vehicles or traffic infrastructure as opposed to from other vehicles or traffic infrastructure (and vice versa). In this regard, the first vehicle may create so-called blacklists and/or whitelists (blacklists for vehicles which have never been trusted and whitelists for vehicles which have always been trusted, or which were trusted at least in the past, i.e., with a lower threshold value).

For example, the method may further comprise a step of providing information on the trustworthiness of the second vehicle or traffic infrastructure and/or of the one or more third vehicles to one or more other vehicles. This allows the other vehicles to transitively use the assessments of the trustworthiness of the second vehicle or traffic infrastructure and/or of the one or more third vehicles.

In some embodiments, the information on the validation of the information on the state of the roadway may be assigned to the information on the state of the roadway based on a comparison of a type of the information on the state of the roadway and of the information on the validation and based on a comparison of the location of the information on the state of the roadway and of the information on the validation. This makes it possible to use validations that do not directly relate to the information on the state of the roadway for determining the trustworthiness of the information on the state of the roadway. Alternatively or additionally, the information on the validation of the information on the state of the roadway may include a reference to the information on the state of the roadway. The information on the validation of the information on the state of the roadway may be assigned to the information on the state of the roadway based on the reference. This allows for simple assignment of the information on the validation of the information on the state of the roadway and the information on the state of the roadway to one another.

The determination of the trustworthiness of the information on the state of the roadway may further be based on information on a trustworthiness of sensor measurements of a vehicle type of the second vehicle or of the traffic infrastructure and/or of the one or more third vehicles. As such, it is also possible to take into account, for example, whether sensors of a particular vehicle type are particularly trustworthy or particularly unreliable—in the latter case without blacklisting the information provider as such, but rather only the specific, relevant type of information (e.g., "black ice" for an inaccurate anti-slip sensor).

Embodiments further provide a computer program for executing the method if the computer program runs on a computer, a processor, or a programmable hardware component.

Some embodiments further provide a device for a first vehicle. The device comprises at least one interface for exchanging information (for example with a second vehicle or traffic infrastructure and/or with one or more third vehicles). The device further comprises a control module designed to obtain information on a state of a roadway from a second vehicle or from traffic infrastructure (for example via the at least one interface). The control module is designed to validate the information on the state of the roadway based on a sensor signal or to obtain information on a validation of the information on the state of the roadway from one or more third vehicles (for example via the at least one interface). The control module is designed to determine a trustworthiness of the information on the state of the roadway based on the validation of the information on the state of the roadway and/or based on the information obtained from the one or more third vehicles on the validation of the information on the state of the roadway.

Additional embodiments are described in greater detail below with reference to the exemplary embodiments shown in the drawings.

The exemplary embodiments may be modified and changed in different ways. The exemplary embodiments are shown as examples in the FIGS. and will be described in detail in this context. It should, however, be noted that it is not intended to restrict exemplary embodiments to the disclosed forms; rather, the exemplary embodiments are to cover all functional and/or structural modifications, equivalents, and alternatives that lie within the scope of the invention. In the description and figures, equivalent reference numbers refer to equivalent or similar elements.

If not otherwise defined, all of the terms used herein (including technical and scientific terms) have the same meaning that an average person in the art in the field to which the exemplary embodiments belong would attribute to them. It should further be noted that expressions such as those that are defined in generally used dictionaries should be interpreted as if they had the meaning that is consistent with their meaning in the context of the relevant field and are not to be interpreted in an idealized or excessively formal sense as long as this is not expressly defined herein.

Some embodiments relate to secured traffic data distribution for supporting driver assistance systems and automated and autonomous driving.

In scenarios in which vehicles make decisions themselves, they may access a database for traffic conditions that is not only as complete as possible (at least with regard to the relevant route section to be covered and with regard to the relevant parameters, such as traffic density, road condition, etc.), but rather that may also be protected against attacks and manipulation, in order to prevent third parties from altering the decision criteria of the vehicle logic unit without authorization and thus indirectly interfere with the control system of the vehicle.

A database of this kind may be provided by a trustworthy data source (e.g., by the manufacturer, traffic data distributed by state institutions, TMC, etc.). However, more up-to-date and thus more valuable information may be supplied by other vehicles that have previously passed along the route section to be covered. For example, the ASR (anti-slip regulation) of a vehicle driving ahead may for example report black ice or sheet ice long before said information is known to the centralized mechanisms and data sources and from there disseminated further. Equally, road damage may be detected by the vehicle sensors and reported to vehicles following behind.

Architectures and mechanisms already exist for establishing links between vehicles, for example car-to-car or car-to-X communication. Such information could in principle also be disseminated via said systems.

In some circumstances, it is dangerous to acquire data of this kind from more or less unknown data sources. For example, it is possible for attackers to pose as a vehicle driving ahead and to send false information or for third parties to infiltrate such communication paths in order to manipulate data distributed by other participants.

As such, it is expedient at least in some cases to protect said data from subsequent manipulation and to ensure the authenticity of the data producer.

Blockchain or, more generally, distributed ledger technology, for example, may be used for this. This technology prevents data manipulation in that the data in question is redundant, i.e., mirrored, thousands of times over. Therefore, if a manipulation attempt is successful, it is not sufficient simply to corrupt a data source—at least 51% of the copies of said data would have to be manipulated, which may become increasingly difficult and, at some point, practically impossible with an ever greater number of copies. In addition, a network of this kind may generally detect and reject the infiltration of manipulated transactions.

The data quality may therefore be increased in that each sender has a unique identifier and, as such, manipulating participants may be identified and blocked.

However, blockchain technology is frequently also associated with high energy consumption and a low transaction throughput. This in fact applies to some prominent real-life applications of this technology. Nevertheless, there are more advanced technologies that no longer have these negative characteristics. However, they may not formally be blockchains, for example, but rather so-called distributed ledger technologies (DLTs), which in principle define a distributed transaction history.

Blockchains are a form of DLT. Another form are, for example, so-called directed acyclic graphs (DAGs), which innately allow for significantly greater scalability and—depending on how the platform used is implemented—also use significantly less energy. As a result, the technology is relevant and useful for the above-mentioned application scenario. Alternatively, vehicle-to-vehicle or vehicle-to-infrastructure communication may be used, however this may offer less security.

Currently, traffic data is mostly delivered in a centralized manner (e.g., TMC—Traffic Message Channel, or by map providers) and is often less up-to-date than information from vehicles driving directly ahead (e.g. a few miles ahead) may be. In addition, centralized systems constitute a much more worthwhile point of attack, since not only are they easier to locate, only one data source needs to be manipulated as opposed to thousands. There is often also the risk of a man-in-the-middle attack, since all consumers of the data retrieve same from one or a handful of service instances. Last but not least, a major disadvantage of centralized services of this kind is that, when the database is accessed, manipulation may still be carried out easily and very quickly afterwards, which is something that distributed ledger technology makes very difficult.

Map application providers may use the information sent by users of the applications to a computer of the manufacturer to update the map applications. However, this cannot prevent the existence of at least partially outdated data. In addition, said data is generally stored in a centralized manner and could potentially be compromised by an attacker. Furthermore, solutions by map producers or TMC generally have no access to the vehicle sensors and therefore may generally only distribute data relating purely to the traffic flow.

The wide range of accurate vehicle sensors today make it possible to detect the current traffic situation in great detail. As such, in future, connected vehicles will be able to send warning and informational reports in good time to other vehicles following on behind on the same route section, which reports communicate potential hazards (such as accidents, roadworks, traffic jams, black ice, uneven road surfaces/potholes, crosswinds, or any type of regulation displayed by road signs) directly and with very little latency. This constitutes an enormous leap forward with respect to modern warning systems, since, in comparison to these centralized systems, not only may many more potential hazards and much more data be recorded and processed, they may also be provided immediately and thus in highly up-to-date form. Such data sources may be essential by the time of highly automated or autonomous driving at the latest.

As a way of taking advantage of these new possibilities, this data could naturally help with the decision-making process of the driver or vehicle (alteration of the speed or travel route, etc.). By the time of automated driving at the latest, there is the danger that attackers could influence traffic events by feeding in false data or by manipulating data that, in actuality, is correct or, in the worst-case scenario, said attackers could even cause accidents by providing various road users with different, i.e., contradictory, data. Furthermore, by not making use of such highly up-to-date data that is accurate at the source, its enormous potential would be wasted.

Some embodiments feature transmission of information by means of decentralized databases, for example based on distributed ledger technology. These are decentralized networks that allow data (in this case traffic data, for example information on the state of a roadway or information on a validation of the information on the state of the roadway) to be distributed while being protected against manipulation. Networks of this kind inherently offer pseudonymity, i.e., the person behind (or the vehicle supplying the data) may remain unknown, but data from said data producer may be clearly identifiable in the network.

The challenge with such decentralized, public networks is generally that attackers (who, by way of example, seek to compromise data) frequently have first, unencumbered access and may also feed false data into the network. However, if such networks are designed to be of a sufficient size in terms of the number of participants, manipulations are refuted by the majority and thus exposed and thus do not form part of the data accepted by the network. The BitCoin blockchain is an example of such a network, as it allows for secure financial transactions without the involvement of intermediaries, such as banks, that check the authenticity and legitimacy of the individual transactions in centralized systems. Some of these networks are therefore designed such that people may take part with their own business cases, e.g., to use them for distributing data without being tied to financial transactions.

However, the present concept goes one significant step further. Distributed ledger technology makes it possible to store data such that it cannot be altered and to assign the data to its producer. However, if it is used to distribute proprietary data, it inherently offers no possibility of checking the content of the data distributed within the network. Nevertheless, said data may be viewed publicly within the network, and as such each network participant may access it and thus validate the content. The concept provides for the trust in the authenticity of the information to be increased the more frequently such a data packet is validated positively.

In the following, the concept presented above will be illustrated with reference to the method, device, and computer program described in the patent claims.

Figure 1B:
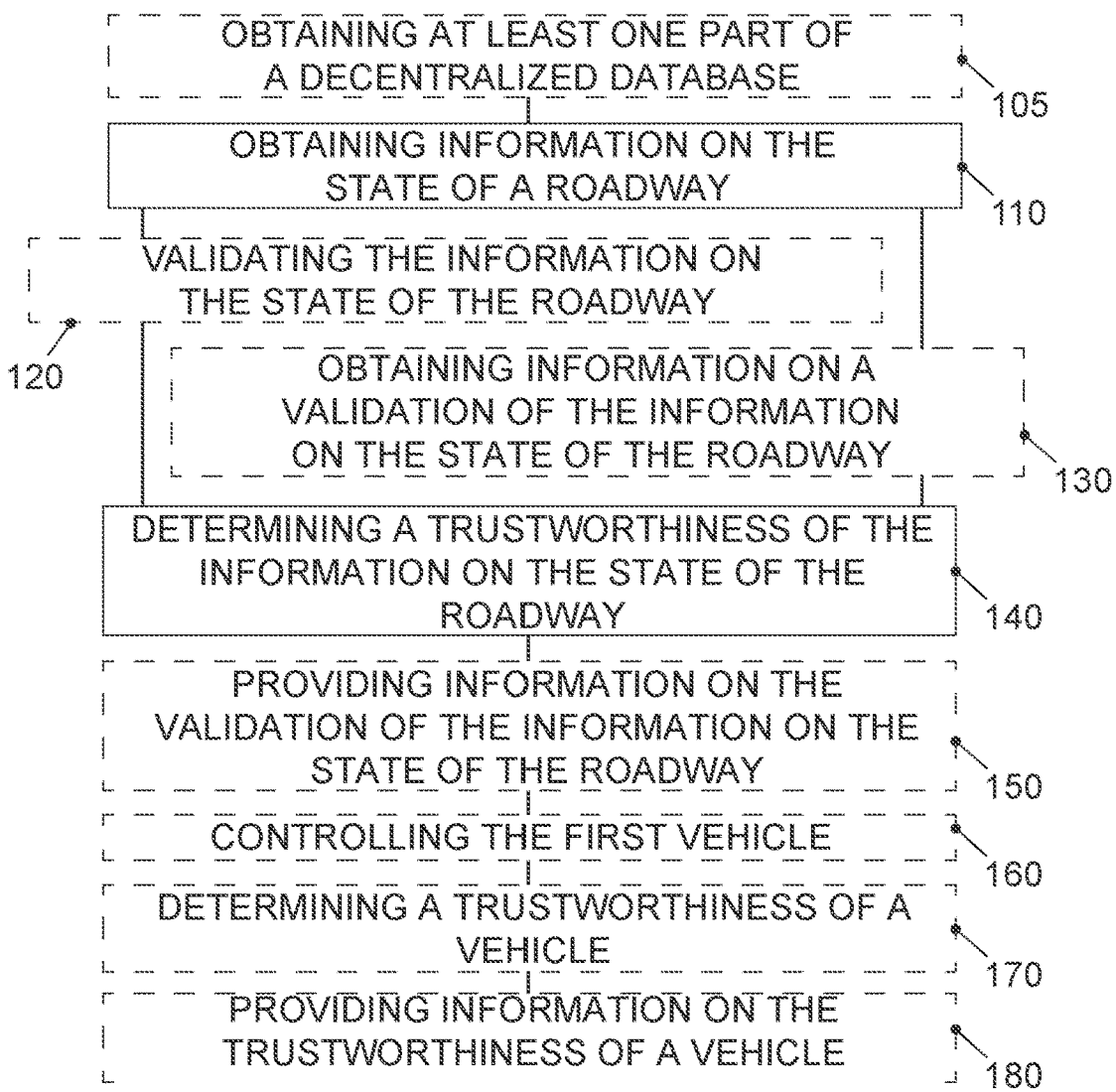

FIGS. 1a and 1b show a flow diagram of an exemplary embodiment of a method for a first vehicle 100. In this regard, the method may be carried out (entirely) by the first method, for example by a device 10 of the vehicle. Alternatively, the method may be carried out by another entity, for example traffic infrastructure. Therefore, the references to the first vehicle should be regarded as an example for said exemplary embodiment, and may be replaced by the traffic infrastructure in another exemplary embodiment.

The methods comprises a step of obtaining 110 information on the state of a roadway from a second vehicle or from traffic infrastructure 200. The method further comprises a step of validating 120 the information on the state of the roadway based on a sensor signal. Alternatively (or additionally), the method comprises a step of obtaining 130 information from one or more third vehicles 300 on a validation of the information on the state of the roadway. The method further comprises a step of determining 140 a trustworthiness of the information on the state of the roadway based on the validation of the information on the state of the roadway and/or based on the information obtained from the one or more third vehicles on the validation of the information on the state of the roadway.

Figure 1C:
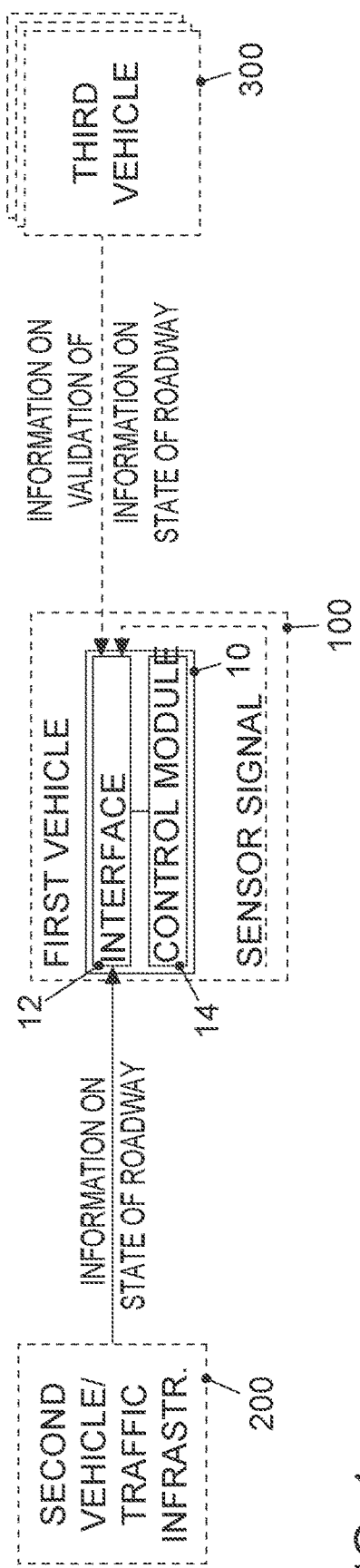
FIG. 1c is a block diagram of an exemplary embodiment of a device for a first vehicle.

FIG. 1c is a block diagram of an exemplary embodiment of a (corresponding) device 10 for the first vehicle 100. The device comprises at least one interface 12 for exchanging information. The device 10 comprises a control module 14. The at least one interface 12 is coupled to the control module 14. The control module 14 is designed to obtain information on a state of a roadway from a second vehicle or from traffic infrastructure 200. The control module 14 is designed to validate the information on the state of the roadway based on a sensor signal. Alternatively (or additionally), the control module 14 is designed to obtain information on the validation of the information on the state of the roadway from one or more third vehicles 300. The control module 14 is designed to determine a trustworthiness of the information on the state of the roadway based on the validation of the information on the state of the roadway and/or based on the information obtained from the one or more third vehicles on the validation of the information on the state of the roadway. FIG. 1c also shows the first vehicle 100 with the device 10. FIG. 1c also shows a system comprising the first vehicle 100, the second vehicle or the traffic infrastructure 200 and the one or more third vehicles 300.

The following description relates to the method from FIGS. 1a and 1b and to the device from FIG. 1c.

Some embodiments are based on checking, based on own sensor measurements, information on a state of a roadway provided by a second vehicle or by traffic infrastructure or to determine, by evaluating validations by the third vehicle of the information on the state of the roadway, whether the information on the state of the roadway is trustworthy. In this connection, the information on the state of the roadway may be validated and confirmed by other participants and thus becomes more trustworthy. It is not strictly necessary for the sender to be trusted, but rather the trust may be conferred on the network. Indeed, the identity of the sender is not important, which makes the concept much more anonymous and decentralized (and thus more secure). Because the data is distributed via the public network in pseudonymized form in some embodiments, any interested participant may benefit. As such, the usability of and trust in the data may be improved, not only in the case of autonomous driving, but also in all cases in which the participants of such a decentralized network validate and confirm the content of each other's data.

For example, the information on the state of the roadway may indicate whether the roadway is icy at a particular position, whether there is a traffic jam at a particular position on the roadway, whether there are roadworks at a particular position on the roadway, etc. In other words, the information on the state of the roadway relates to a position, and the information on the validation of the information on the state of the roadway includes information on whether the information on the state of the roadway at said position is correct. For example, the information on the state of the roadway may indicate that, at a particular position:

the roadway is icy,
the roadway is dirty,
the roadway is uneven (for example, there are potholes),
there is a crosswind,
there is a traffic jam on the roadway,
an accident has taken place on the roadway,
there are roadworks on the roadway,
the roadway is regulated by a (temporary) road sign, or
the roadway is blocked at said point.

For this purpose, the corresponding information must be transmitted between the vehicles. For this purpose, in some embodiments, the information is transmitted via a decentralized database that may be based, for example, on distributed ledger technology. In other words, the information on the state of the roadway and/or the information on the validation of the information on the state of the roadway may be transmitted between the vehicles via a decentralized database. The term "decentralized database" means that, in contrast to centralized storage under the control of an individual network component, storage takes place decentrally under the control of multiple network components and on multiple network components. This increases the security of the data (redundancy) and, as explained in greater detail in the following, may also serve to increase the reliability and the protection against manipulation. The decentralized database may for example correspond to a database in line with DLT, in particular a blockchain or a technology based on multidimensional directed graphs. In this regard, the decentralized database may be based on distributed ledger technology and/or on a directed acyclic graph. In this regard, a network is used which has multiple network components or computers that agree on an order of transactions and update data by means of said transactions. This data is then distributed to and stored on the participating network components. Because the components agree in advance on transactions and the data manipulated thereby, later manipulations carried out on the data or transactions may be identified. The information on the state of the roadway and/or the information on the validation of the information on the state of the roadway may be protected against manipulation and/or stored in a transparent manner on the decentralized database. Connections that may in principle be directed or undirected are therefore established between the individual network components. In some embodiments, a directed acyclic graph may be used here.

In order to transmit the information between the vehicles, the information on the state of the roadway and/or the information on the validation of the information on the state of the roadway may include one or more identifiers of the first vehicle, second vehicle/traffic infrastructure and/or the one or more third vehicles, for example such that the relevant information may be assigned to the first vehicle, second vehicle/traffic infrastructure and/or the one or more third vehicles.

For example, the identifier may be a pseudonym of the first vehicle, second vehicle/traffic infrastructure or of the one or more third vehicles, for example an identifier that identifies the vehicles/traffic infrastructure but that does not make it possible to track specific persons. For example, the identifier may correspond to a digital signature that comes from a manufacturer of the second vehicle/traffic infrastructure and/or of the one or more third vehicles, but only reveals same as vehicles/traffic infrastructure. In some embodiments, the identifier may be changeable. The identifier may for example be changed on a regular basis or on the instruction of a user of the vehicles/traffic infrastructure. In some embodiments, the information on the state of the roadway and/or the information on the validation of the information on the state of the roadway is also signed, for example based on a digital key of the first vehicle, the second vehicle/traffic infrastructure and/or the one or more third vehicles. All distributed messages (for example the information on the state of the roadway) may be signed with a certificate, such that falsification or manipulation of the messages is rendered more difficult.

In some embodiments, as shown in FIG. 1*b*, the method further comprises a step of obtaining 105 at least one part of the decentralized database based on a position of the first vehicle. For example, the step of obtaining 105 the part of the decentralized database includes a step of requesting the part of the decentralized database from a network node, for example based on the position of the first vehicle on an anticipated route of the vehicle. Alternatively, the part of the decentralized database is distributed via a broadcast mechanism.

Alternatively, the information may be transmitted directly between the vehicles and/or traffic infrastructure without the intermediary of a decentralized database. In principle, the concept of the weighting system (and ultimately also of the reputation system) may also be applied in purely vehicle-to-X contexts (without distributed ledger). In other words, a vehicle may also gage the trustworthiness of information in such contexts by counting how many participants/vehicles have provided similar or identical information. However, if DLT is used, the benefit is potentially higher (in that information relating to distant positions may also be retrieved and used and thus taken into account, for example, during route planning and thus a larger and thus more secure pool of data is available), nevertheless, protection against incorrect/malicious messages may be increased even without DLT. In other words, the information on the state of the roadway and/or the information on the validation of the information on the state of the roadway may be transmitted between the vehicles and/or the traffic infrastructure via direct vehicle-to-vehicle communication or indirect vehicle-to-vehicle communication (i.e., vehicle-to-X communication). Alternatively, vehicle-to-vehicle communication may be used with the assistance of a cellular mobile communication system (e.g., the coming 3GPP mobile communication standard 5G) (also known as Cellular Vehicle-2-X).

The method comprises a step of obtaining 110 the information on the state of a roadway from the second vehicle or traffic infrastructure 200. If the information on the state of the roadway is transmitted via the decentralized database, the step of obtaining the information on the state of the roadway may also include a step of retrieving the information on the state of the roadway from the decentralized database. The information on the state of the roadway is stored previously in the decentralized database by the second vehicle or traffic infrastructure. Alternatively, the information on the state of the roadway may be transmitted via vehicle-to-vehicle communication. For example, the step of obtaining the information on the state of the roadway may equate to receiving the information on the state of the roadway via (direct) vehicle-to-vehicle communication.

In some cases, the method further comprises a step of validating 120 the information on the state of the roadway based on a sensor signal. If the method is carried out by the first vehicle, the sensor signal may for example come from a sensor module of the first vehicle. As such, the sensor signal may for example be based on an environmental sensor of the vehicle, for example a radar sensor, an ultrasound sensor, a lidar sensor, a temperature sensor, a rain sensor, or a combination of several of these sensors. For example, the step of validating the information on the state of the roadway may equate to comparing the information on the state of the roadway with the portrayal of the surroundings obtained via the sensor signal. The information on the state of the roadway may be confirmed if the sensor signal includes or represents information that is consistent with the information on the state of the roadway. Alternatively or additionally, the vehicle sensors may be used to ask the user of the vehicle about the state of the roadway. In suitable scenarios, a vehicle could even ask the driver (or passenger) for an assessment (as part of an overlay in a human-machine interface (HMI)). Example: "Can you confirm that the right-hand lane is impassable?" or the like. A distraction of this kind would be unproblematic by the time of autonomous vehicles at the latest. As such, the sensor signal may for example be based on an input of the user of the vehicle, for example an input via a touch-sensitive screen (i.e., touchscreen) or an input via a microphone. The information on the state of the roadway may then be validated based on the user input.

In some cases, the method further comprises a step of obtaining 130 information on a validation of the information on the state of the roadway from one or more third vehicles 300. The information on the validation of the information on the state of the roadway from the one or more third vehicles 300 may for example indicate whether the one or more third vehicles confirm the information on the state of the roadway. In a simple implementation, the information on the validation of the information on the state of the roadway may include one or more binary values that indicate whether the one or more third vehicles confirm or deny the information on the state of the roadway. Alternatively or additionally, the information on the validation of the information on the state of the roadway may include information on a state of the roadway detected by means of sensors of the one or more third vehicles. Said information may then be evaluated by means of the first vehicle.

The information on the validation of the information on the state of the roadway may be assigned to the information on the state of the roadway beforehand. The following approaches may be chosen for this. Either the information on the information on the state of the roadway and the information on the state of the roadway may be compared with regard to their content, for example based on a type of the information on the state of the roadway and based on a position on the roadway to which the information relates, or the information on the validation relates directly, for example via a reference or identifier, to the information on the state of the roadway. In other words, in the first case, the information on the validation of the information on the state of the roadway may be assigned to the information on the state of the roadway based on a comparison of a type of the information on the state of the roadway and of the information on the validation and based on a comparison of the location of the information on the state of the roadway and of the information on the validation. In the process, the types of the information on the state of the roadway and of the information on the validation of the information on the state of the roadway and the positions of these two items of information are compared. In the second case, the information on the validation of the information on the state of the roadway may include a reference to the information on the state of the roadway. The information on the validation of the information on the state of the roadway may be assigned to the information on the state of the roadway based on the reference.

The types of the information on the state of the roadway may be derived from the various states that may be reported via the information on the state of the roadway. For example, the information on the state of the roadway may correspond to a type from the group consisting of a report on an icy roadway, a report on a dirty roadway, a report on an uneven roadway, a report on a crosswind over the roadway, a report on a traffic jam on the roadway, a report on an accident on the roadway, a report on roadworks on the roadway, and a report on a (temporary) road sign on the roadway.

The method is based on the fact that the information on the state of the roadway is checked in a self-learning network formed by the first vehicle and the one or more third vehicles, in order to be able to assess the trustworthiness of the information on the state of the roadway. This consists, for example, of two components: Firstly, the information on the state of the roadway is confirmed or denied by the one or more third vehicles by means of same providing the information on the validation of the information on the state of the roadway, and, in another step, it may be ascertained which vehicles or traffic infrastructure provides or correctly confirms predominantly trustworthy information on the state of the roadway, such that said vehicles or traffic infrastructure may be trusted more over time than others. The method therefore also comprises a step of determining 140 a trustworthiness of the information on the state of the roadway. The trustworthiness may, in some cases, be determined based on the validation of the information on the state of the roadway. For example, the information on the state of the roadway may be deemed trustworthy if the information on the state of the roadway is confirmed by means of the sensor signal. Alternatively or additionally, the trustworthiness may be determined based on the information obtained from the one or more third vehicles on the validation of the information on the state of the roadway. For example, during determination of the trustworthiness of the information on the state of the roadway, the trustworthiness of the information on the state of the roadway may be increased if a vehicle of the one or more third vehicles confirms the information on the state of the roadway, i.e. if the information on the validation of the information on the state of the roadway indicates that a vehicle of the one or more third vehicles confirms the information on the state of the roadway. Equally, the trustworthiness may also decrease. For example, the trustworthiness of the information on the state of the roadway may be reduced if a vehicle of the one or more third vehicles denies the information on the state of the roadway, i.e. if the information on the validation of the information on the state of the roadway indicates that a vehicle of the one or more third vehicles denies the information on the state of the roadway.

The information from the second vehicle/traffic infrastructure and from the one or more third vehicles may be rated differently, for example based on previous experiences of the first vehicle with the second vehicle/traffic infrastructure and/or with the one or more third vehicles. For example, it is more likely that vehicles/traffic infrastructure may be trusted if they have provided or correctly validated trustworthy information on the state of the roadway in the past. In other words, as shown in FIG. 1b, the method may also comprise a step of determining 170 a trustworthiness of the second vehicle or of the traffic infrastructure 200 and/or of the one or more third vehicles 300 based on the trustworthiness of the information on the state of the roadway. The trustworthiness (also referred to as "score") in this case refers to the quality of the data provided to the network by a participant. However, this is optional, since, in some embodiments, the information on the state of the roadway may be used, even if the sender is not trusted, if a sufficient number of participants have confirmed said information.

For example, the trustworthiness of the second vehicle or traffic infrastructure 200 may be increased if the trustworthiness of the information on the state of the roadway that comes from the second vehicle or traffic infrastructure 200 is more trustworthy, and/or may be reduced if the trustworthiness of the information on the state of the roadway that comes from the second vehicle or traffic infrastructure 200 is less trustworthy. The trustworthiness of a vehicle of the one or more third vehicles 300 may be increased if the information on the validation of the information on the state of the roadway is consistent with the information on the validation of the information on the state of the roadway from other vehicles of the one or more third vehicles, for example if the information on the validation of the information on the state of the roadway conforms to the trustworthiness of the information on the state of the roadway, and vice versa. The reduction in trustworthiness may not occur if the type of the information on the state of the roadway or of the information on the validation of the information on the state of the roadway describes a state that is of short duration, for example a crosswind.

The trustworthiness of the second vehicle or traffic infrastructure and/or of the one or more third vehicles determined in the process may then be used to assess the trustworthiness of the information on the state of the roadway. The information on the state of the roadway and the information on the validation of the information on the state of the roadway may be weighted and/or rated differently based on the trustworthiness of the sources of said information. In other words, the determination of the trustworthiness of the information on the state of the roadway may be based on a previous trustworthiness of the second vehicle or traffic infrastructure and/or of the one or more third vehicles.

Furthermore, the trustworthiness of the information on the state of the roadway may be determined based on a reliability of sensors on which the information on the state of the roadway is based. For example, in some vehicle types, it is known that their sensors frequently produce trustworthy information on the state of the roadway. In other words, the determination of the trustworthiness of the information on the state of the roadway may further be based on information on a trustworthiness of sensor measurements of a vehicle type of the second vehicle or traffic infrastructure and/or of the one or more third vehicles.

In some embodiments, the aim is for the first vehicle to be controlled based on the information on the state of the roadway. In this case, the first vehicle may for example be an autonomously controlled vehicle (or autonomous vehicle for short) or a semi-autonomously controlled vehicle, i.e., a vehicle that is controlled by means of driver assistance systems and only requires intervention on the part of the driver in exceptional cases. Alternatively or additionally, the information on the state of the roadway may be used to support the driver via driver assistance systems. The prerequisite for this is that a user of the vehicle trusts the information on the state of the roadway. This may for example take place in that the first vehicle explicitly asks the first user whether they trust the information on the state of the roadway based on all the information available each time information on the state of the roadway is provided. A more practicable approach is for the user to define one or more threshold values for the trustworthiness from which said user trusts the information on the state of the roadway. In other words, as shown in FIG. 1b, the method may further comprise a step of controlling 160 the first vehicle based on the information on the state of the roadway if the trustworthiness of the information on the state of the roadway exceeds a threshold value. Alternatively or additionally, the method may also comprise a step of providing driving assistance based on the information on the state of the roadway if the trustworthiness of the information on the state of the roadway exceeds the threshold value. The threshold value may for example be a user-selected threshold value. In this regard, the threshold value may be set differently for the different types of the information on the state of the roadway. In other words, the threshold value may be dependent on a type of the information on the state of the roadway. The threshold value may depend on a hazard potential of the information on the state of the roadway. The hazard potential may be derived from the type of the information on the state of the roadway, i.e., it may be based on the type of the information on the state of the roadway.

In some embodiments, the trustworthiness of the information on the state of the roadway is not only gaged for the first vehicle, said information may also be forwarded to other vehicles. As such, the method may further comprise a step of providing 150 information on the validation of the information on the state of the roadway by means of the first vehicle to one or more other vehicles, for example via the decentralized database or via (direct) vehicle-to-vehicle communication. The method may further comprise a step of providing information on the trustworthiness of the information on the state of the roadway to one or more other vehicles, for example via the decentralized database or via (direct) vehicle-to-vehicle communication. Alternatively or additionally, the method may further comprise a step of providing 175 information on the trustworthiness of the second vehicle or traffic infrastructure 200 and/or of the one or more third vehicles 300 to one or more other vehicles, for example via the decentralized database or via (direct) vehicle-to-vehicle communication. In this case, blacklists and/or whitelists of the first vehicle may be provided to the other vehicles. If the other vehicle trusts the first vehicle, it potentially also trusts the blacklist/whitelist thereof and adopts it or uses it at least to modify the threshold values when information is provided by a relevant vehicle.

In some embodiments, the first vehicle, the second vehicle and/or the one or more third vehicles may for example be an autonomously controlled vehicle, a semi-autonomously controlled vehicle, a land vehicle, a water vehicle, an air vehicle, a rail vehicle, a road vehicle, a car, an all-terrain vehicle, a motor vehicle, or a truck.

The traffic infrastructure may be a device that is designed to monitor or control roadways, for example a traffic light system, a road sign, a traffic sensor, a weather satellite, or a central traffic monitoring system of a navigation solution.

The at least one interface 12 may for example be one or more inputs and/or one or more outputs for receiving and/or transmitting information, for example in digital bit values, based on a code, within a module, between modules, or between modules of different entities.

In some embodiments, the control module 14 may be any controller or processor or a programmable hardware component. For example, the control module 14 may also be realized as software that is programmed for a corresponding hardware component. The control module 14 may therefore be implemented as programmable hardware with correspondingly adapted software. In this context, any processors such as digital signal processors (DSPs) may be used. Exemplary embodiments are not restricted to a specific type of processor in this context. Any number of processors or also a plurality of processors are conceivable for implementing the control module 14.

In the following, examples shall be given in order to illustrate the concepts outlined above.

On a winter day, a vehicle (for example the second vehicle) reports to the network (for example the decentralized database) that there is black ice on a viaduct on the A2 (detected by the vehicle sensors, e.g., the ASR). The information includes a time stamp, the type of event ("black ice") and the geographic coordinates (in the case of multiple lanes potentially also the affected lane). A vehicle (for example the first vehicle) following on shortly behind obtains said report (for example as information on the state of the roadway), but finds that there is no confirmation of said information and must therefore decide for itself whether this information is relevant. The sensors of said vehicle then, when passing the location in question, detect that the information was correct and confirm same (for example by validating the information on the state of the roadway). As a result, the report is given a higher weight in the network. The weight of the information increases with each vehicle that follows on behind and that may validate said information. Equally, vehicles following on behind could of course also mark said information as "not validated" if they are of the opinion that the information is false.

Figure 2A:
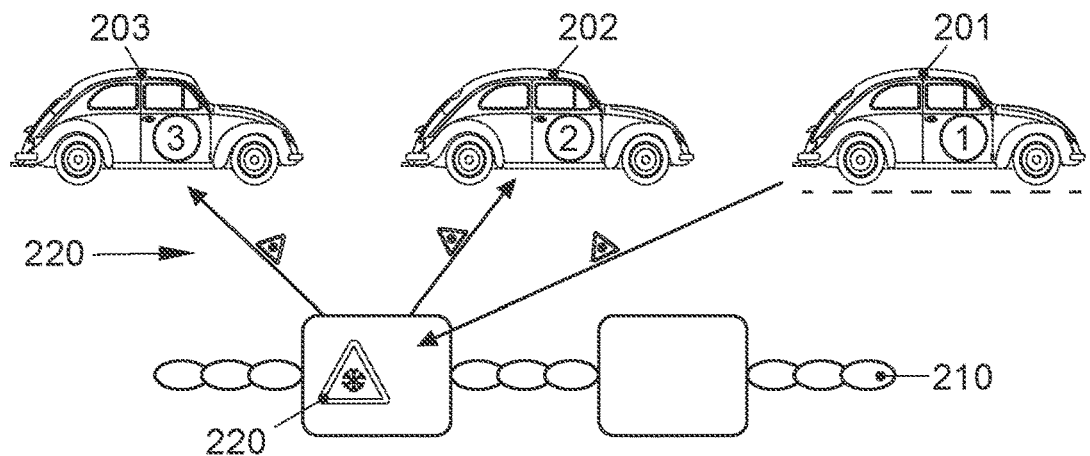
FIGS. 2a to 2c show an exemplary embodiment in which correct information on the state of the roadway is confirmed by vehicles following behind.
Figure 2B:
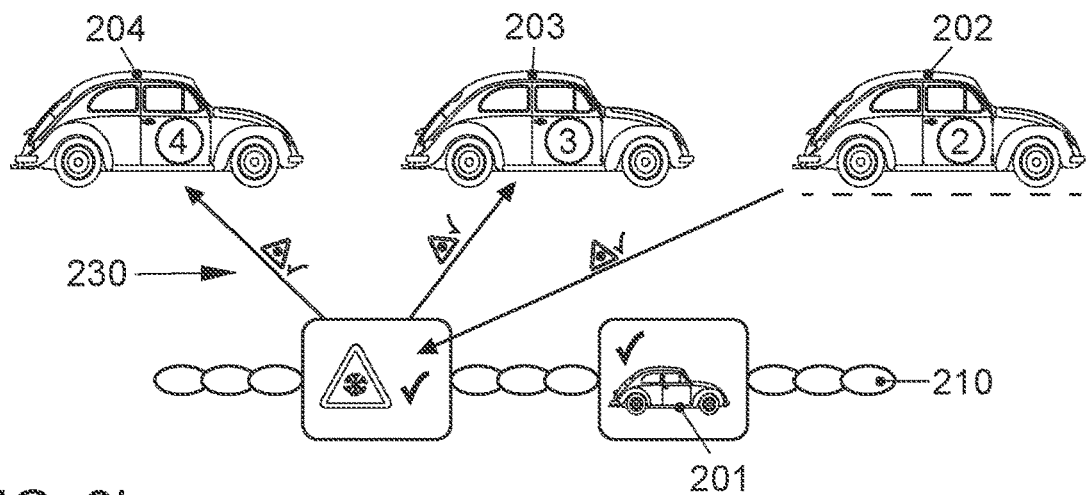
Figure 2C:
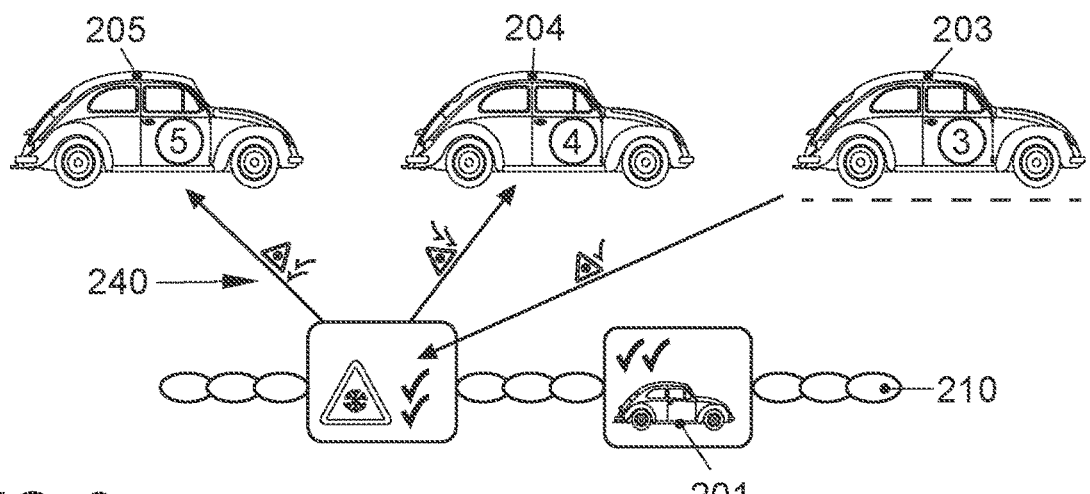

FIGS. 2a to 2c show an exemplary embodiment in which correct information on the state of the roadway is confirmed by vehicles following on behind. FIGS. 2a to 2c show the vehicles 1 to 5 (reference numerals 201-205) and the blockchain/distributed ledger 210. In FIG. 2a, vehicle 1 reports "Black ice at geoposition X" 220 to the network with a time stamp. This event 220 is reported to the vehicles 2 and 3 via the blockchain/distributed ledger 210. In FIG. 2b, vehicle 2 confirms "Black ice at geoposition X" 230 to the network with a time stamp. The confirmation 230 is reported to the vehicles 3 and 4 via the blockchain/distributed ledger 210. In FIG. 2c, the vehicle 3 confirms "Black ice at geoposition X" 240 to the network with a time stamp. This confirmation is reported 240 to the vehicles 4 and 5 via the blockchain/distributed ledger 210.

Figure 3A:
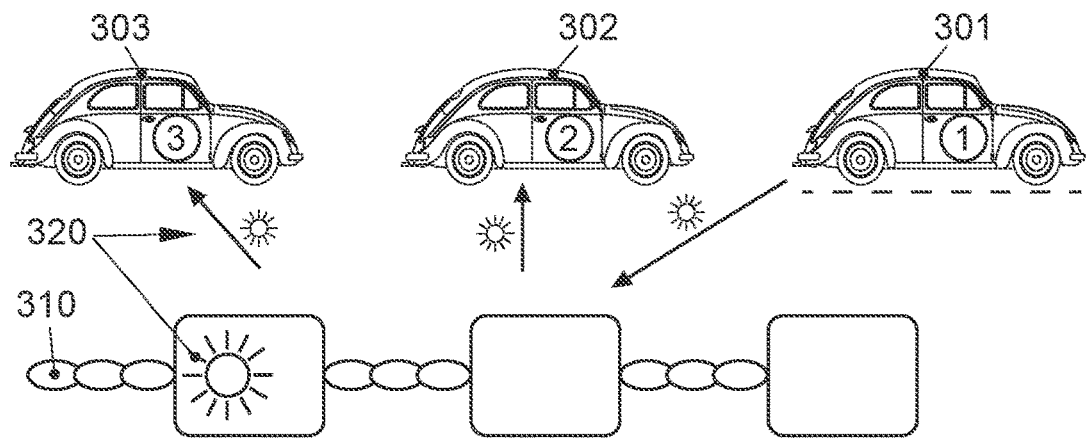
FIGS. 3a to 3c show an exemplary embodiment in which false information on the state of the roadway is denied by vehicles following behind.
Figure 3B:
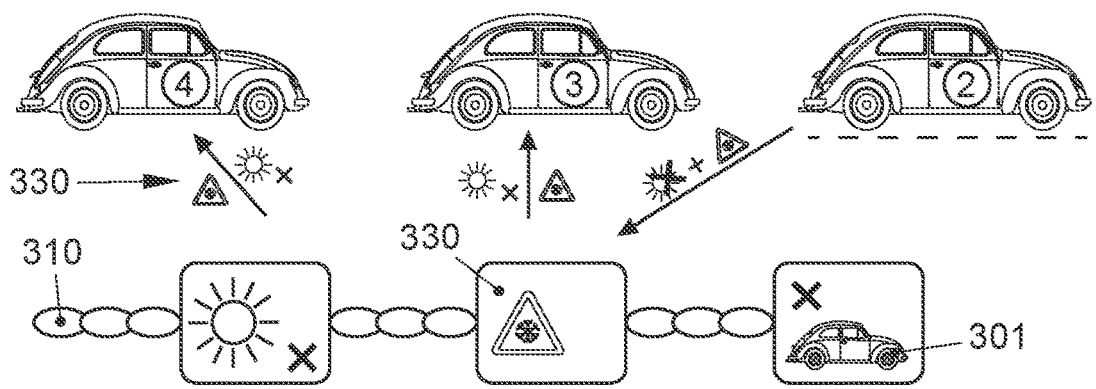
Figure 3C:
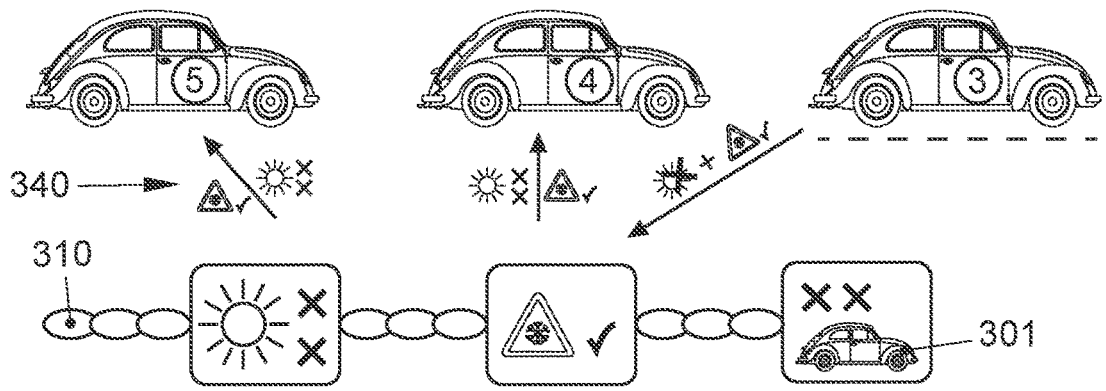

The situation is different in the example of FIGS. 3a to 3c. FIGS. 3a to 3c show an exemplary embodiment in which false information on the state of the roadway is denied by vehicles following on behind. FIGS. 3a to 3c show the vehicles 1 to 5 (reference numerals 301-305) and the blockchain/distributed ledger 310. In FIG. 3a, the vehicle 1 sends the false report "Excellent weather at geoposition X" 320 to the network with a time stamp. This event 320 is reported to the vehicles 2 and 3 via the blockchain/distributed ledger 310. In FIG. 3b, vehicle 2 sends a contradiction of the false report and the actual weather (reference numeral 330) to the network. Said contradiction and the actual weather 330 is reported to the vehicles 3 and 4 via the blockchain/distributed ledger 310. In FIG. 3c, vehicle 3 sends a confirmation of the black ice report and a contradiction of the false report (reference sign 340) to the network. Said confirmation and contradiction 340 is reported to the vehicles 4 and 5 via the blockchain/distributed ledger 310.

In this case, too, there is the possibility in decentralized networks of this kind of an attacker marking correct information as a false report. However, if a participant considers the documented event to be correct when passing the corresponding location, the false reporter is exposed. Of course, a participant should not be classified as "not trustworthy" (i.e., blacklisted) upon the first false report. This is because the participant may have vehicle sensors that did not detect the event or because the effect of the event "black ice" was significantly reduced for said participant due to other factors (e.g., less of a crosswind) and thus not perceived. However, if an autonomous vehicle builds up blacklists and whitelists for the other network participants or road users, a reputation system is created over time which may assess the trustworthiness of event reports from other network participants. As such, not only does the event reporter receive a higher trust bonus when an event report turns out to be true, so too do all other network participants that marked said event report to be true.

Figure 4:
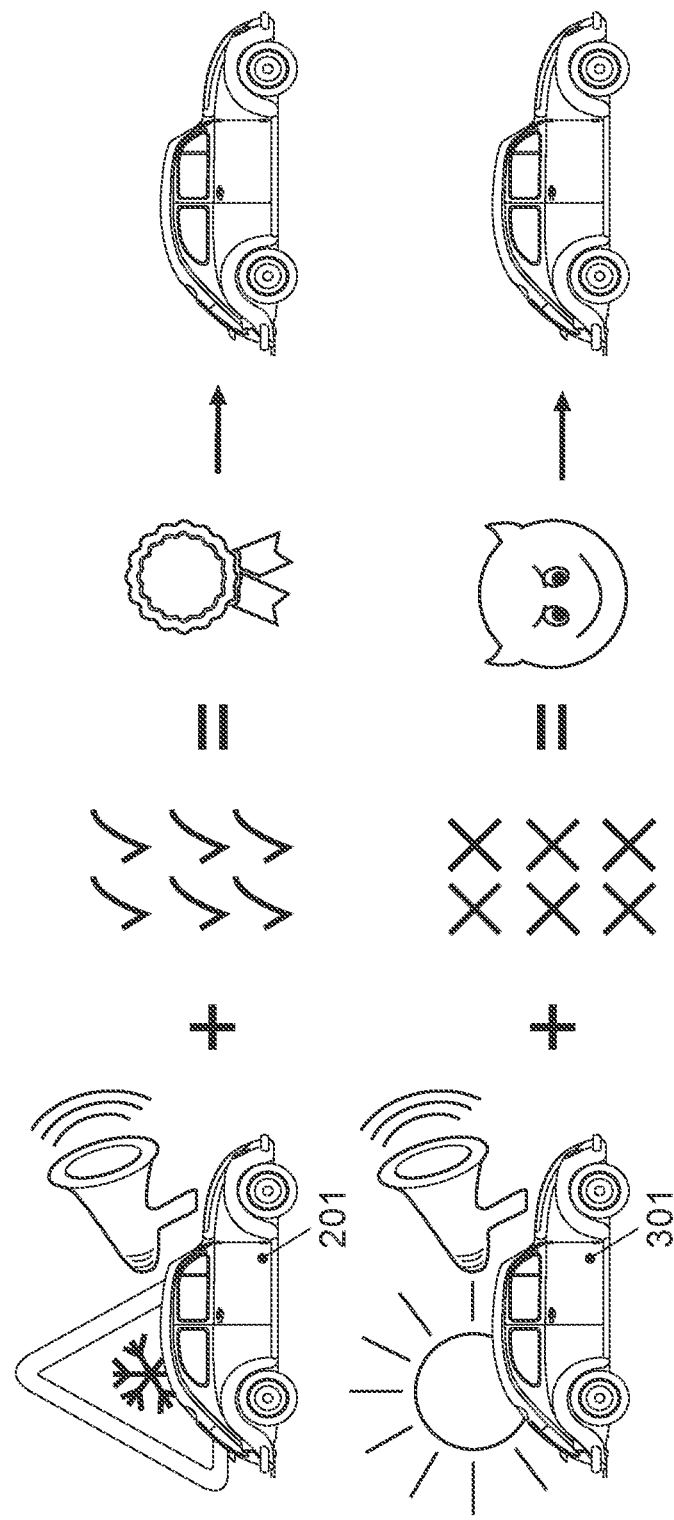
FIG. 4 illustrates a reputation system.

FIG. 4 illustrates the reputation system. The event of vehicle 1 201 from the examples in FIGS. 2a to 2c has been confirmed by the vehicles 2 and 3, which boosts the reputation of the vehicle and reveals it as a trustworthy vehicle. However, the event reported by vehicle 1 301 from the examples in FIGS. 3a to 3c has been contradicted by the vehicles 2 and 3, and therefore the vehicle 301 is identified as an untrustworthy vehicle or as a malicious vehicle.

Again, this reputation system may be compared with the network such that a manipulative participant may be identified even if none of its false information could be exposed previously. An attacker could still regularly create new identities or use different existing identities, but would then be subject to the lack of weighting: their false reports would only be trusted if enough (trustworthy) participants confirm them. Based on game-theory considerations, this is quite improbable, since those who confirm false reports also run the risk of losing their reputation. Caution is also advised for events of short duration (e.g., "crosswind") that may no longer be validated by participants following on behind. In these cases, the reputation of the information provider must not be allowed to suffer.

In some embodiments, the decision-making power ultimately always rests with the vehicle or driver. As such, each participant (person or vehicle or, if applicable, the vehicle manufacturer on behalf of their clients) may define their own suitable threshold value (for example the threshold value for the trustworthiness of the information on the state of the roadway) from which event reports (for example the information on the state of the roadway) are considered valid, this again potentially depending on the type of event: a report that there is black ice is perhaps more likely to be trusted than one which claims that the black ice event no longer exists, since the risk of ignoring the information in the former case is considerably higher for a road user.

Equally, the reputation (trustworthiness) of the event reporter may cause the effective threshold value at the receiver to be reduced for participants classified as trustworthy (example: reports from vehicle X are trusted even with a lower weighting for the event report, since said vehicle has exceeded the confirmation threshold value in more than 500 cases) or it may cause the effective threshold value to be increased for participants if same have more frequently provided false reports.

The network (for example the decentralized database) may be capable of learning in so far as the quality of the sensors of various vehicle types is concerned. If, for example, it is known that certain vehicles of a manufacturer have problems with detecting black ice, because their sensors are not of sufficiently high quality, this information could prevent an afflicted road user from being classified as untrustworthy. Reports or positive and negative confirmations of the relevant type would then simply no longer be taken into account for this participant or they would be downgraded.

The final decision-making power may therefore also (always) rest with the vehicle since distributed ledger technology has no immediate real-time capability. For this reason, an autonomously driving vehicle may also retrieve said information from the network according to its travel route (with reasonable variance, e.g., identification of all events within the next 20 km in the direction of travel with a variance of +/−45 degrees with respect to the direction of travel), for example by obtaining at least part of the decentralized database.

By virtue of these mechanisms, the data obtained by a participant from the network may be trusted much more than in cases where said data is merely exchanged between two participants. In such cases, not only would the validation of the data by means of the network be absent, so too and above all would the confirmation of information by other road users. Although this delays the time at which information is trusted (waiting for a higher weighting), it still occurs within a shorter time frame than with centralized systems (in which the data must also be subjected to a test before it may be provide to the public).

Furthermore, vehicle manufacturers may use this data for analysis purposes in order to improve their sensors or assistance systems. In the process, it would quickly become obvious if a specific vehicle in their portfolio is deficient when it comes to detecting environmental factors (e.g., black ice).

Some embodiments have the following properties:
  Use of distributed ledger technology (for example the decentralized database) as a medium for exchanging traffic information (for example the information on the state of the roadway) in order to disseminate same in a manipulation-proof manner.
  Weighting system, in which other road users (e.g., vehicles by means of their sensors) confirm disseminated information or mark said information as false (said information for example being the information on the state of the roadway and said confirmation or marking of said information as false being done by exchanging the information on the validation of said information on the state of the roadway). As a result, the quality of the data or accuracy of the information may be increased, trust in data created, and thus use of data of unknown origin made possible even in networks in which the data suppliers are not always known.
  Reputation system, in order to increase the trust in information and to make said information available for use faster (for example by determining the trustworthiness of the vehicles/traffic infrastructure).
  (Self-)learning network, which recognizes commonalities (e.g., the fact that certain vehicle types exhibit poor detection rates for certain environmental factors).

In principle, the concept could also be implemented on a centralized platform. For example, at least the method steps represented by the features mentioned in points 2, 3, and 4 could be implemented and used there.

Unlike centralized solutions, the solution mentioned in the first point and based on distributed ledger technology makes it possible to create trust in the authenticity of the data (i.e. that the data has not been manipulated). This trust is achieved both by means of the innate resistance to manipulation and by means of the high transparency of the data. In contrast, at least some centralized solutions do not provide this trust (due to the above-described properties and vectors of attack). Along with this, decentralized solutions may also provide a higher resistance to failure (if one node or server is no longer accessible, hundreds or thousands of others are still available), which means that such a system also scales much better.

Some embodiments may be applied in scenarios in which connected vehicles provide their data to other participants or use data provided by other participants or in which it is expedient to use external data sources, thus especially in autonomous vehicles but also to support existing assistance systems: for example, the information that the roadway is blocked by a broken-down vehicle after the next bend may already be used, i.e. in non-autonomous or partially autonomous vehicles, to automatically brake the vehicle or at least provide a hazard warning to the user (e.g. on the HUD or instrument cluster or audibly). Here, not only motor vehicles of a manufacturer are meant, but rather all types of mobility services (keyword "MaaS") of which motor vehicles may only represent a part. In such scenarios, in particular, it may be important to operate open networks which all mobility players may join in order to exchange data—in order to connect all data providers with one another and thus to provide the client with the best support and user experience. These include, for example, railway companies, local transport associations, taxi services, airlines, etc. As such, different modes of transportation may benefit from the exchange of (environmental) data. The concept may be used in all sectors in which data of other or unknown parties is to be used and in which there is the possibility of said data being confirmed by other participants. Another example of this would be the mapping of (sustainable) supply chains in which the progress of the process or the sustainability of various participants or process steps is confirmed by third parties.

Some embodiments relate to the fact that environmental data (for example the information on the state of the roadway) is distributed in a decentralized network such that it may be used by other road users and a significant increase in the quality and up-to-dateness of the data is achieved in spite of or rather because of the decentralization. The focus is on environmental conditions, which may make not only autonomous driving safer and more predictable.

Some embodiments are also linked to a location and time, but also to a (unique) pseudonym. In many cases, it is irrelevant which person or vehicle supplied the data or, indeed, the highest possible degree of anonymization is sought. At least some embodiments intend, with the reputation system, for each participant to be able to maintain their own whitelists and blacklists of other participants in order to be able to identify information from a particular pseudonym as valid more quickly, but these are potentially optional, since the information is confirmed by the network, i.e., other participants. Furthermore, the reputation system is based on a pseudonym, i.e., although a sender of information uses a unique identifier, same does not permit any inferences regarding the participant themselves (the person, the vehicle) and thus cannot be used to identify a driver.

In some embodiments, the decentralized nature of the participants is used to gather data more quickly, as in approaches in which participants gather the data in a central service. However, in those cases, a provider must be trusted, not only to have good intentions but also to protect their systems such that no other malicious actors may exploit the centralized nature of the solution. In a decentralized environment, it is easier for malicious actors to feed in false data in the first place. However, because, based on experiences in game theory, there are more and more benign participants in networks of a sufficient size who may validate the data of the network, the data quality and independence from an intermediary may be greatly increased, especially also when the data is stored such that it cannot be modified (blockchain/DLT). In order to support this further and make it even more efficient, some embodiments offer the possibility of other participants confirming the content of information within the network and also offer the reputation system as a supplement.

Another exemplary embodiment is a computer program for executing at least one of the above-described methods, if the computer program runs on a computer, a processor, or a programmable hardware component. Another exemplary embodiment is also a digital storage medium that is machine- or computer-readable, and that has electronically readable control signals which may interact with a programmable hardware component such that one of the above-described methods is executed.

The features disclosed in the above description, the following claims, and the accompanying FIGS. may be implemented in their different configurations both individually as well as in any combination to realize an exemplary embodiment.

Although many aspects were described in conjunction with a device, it is understood that these aspects also represent a description of the corresponding method, and therefore a block or a component of a device is also to be understood as a corresponding method step or as a feature of a method step. Analogously, aspects that were described in conjunction with or as a method step also represent a description of a corresponding block or detail or a feature of a corresponding device.

LIST OF REFERENCE NUMERALS

10 Device for a first vehicle
12 At least one interface
14 Control module
100 First vehicle
105 Obtaining at least one part of a decentralized database
110 Obtaining information on the state of the roadway
120 Validating the information on the state of the roadway
130 Obtaining information on a validation of information on the state of the roadway
140 Determining a trustworthiness of the information on the state of the roadway
150 Providing information on the validation of the information on the state of the roadway
160 Controlling the first vehicle
170 Determining a trustworthiness of the second vehicle or traffic infrastructure and/or of the one or more third vehicles
175 Providing information on the trustworthiness of the second vehicle or traffic infrastructure and/or of the one or more third vehicles
200 Second vehicle/traffic infrastructure
201-205 Vehicles 1 to 5
210 Distributed ledger/blockchain
220 Report "Black ice at geoposition X"
230, 240 Confirmation of the report
300 One or more third vehicles
301-305 Vehicles 1 to 5
310 Distributed ledger/blockchain
320 False report "Excellent weather at geoposition X"
330 Contradiction of the false report and the actual weather
340 Confirmation of the black ice report and contradiction of false report The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for a first vehicle, comprising:
obtaining information on a state of a roadway from a second vehicle or from traffic infrastructure;
obtaining validation information on a validation of the information on the state of the roadway from one or more third vehicles, which validation information comprises weighing data, providing a measure for how many third vehicles confirm and/or reject the state of the roadway; and
determining a trustworthiness of the information on the state of the roadway based on the information obtained from the one or more third vehicles; wherein
during determining of the trustworthiness of the information on the state of the roadway, the trustworthiness of the information on the state of the roadway is increased if the weighing data indicates that a vehicle of the one or more third vehicles confirms the information on the state of the roadway;
the trustworthiness of the information on the state of the roadway is reduced if the weighing data indicates that a vehicle of the one or more third vehicles rejects the information on the state of the roadway; and wherein the information on the state of the roadway and the information on the validation of the information on the state of the roadway is transmitted between the vehicles via a decentralized database.

2. The method of claim 1, comprising: providing the validation information of the information on the state of the roadway by the first vehicle for one or more other vehicles via the decentralized database.

3. The method of claim 2, wherein the decentralized database is based on one or more of a distributed ledger technology and a directed acyclic graph.

4. The method of claim 2, comprising obtaining at least one part of the decentralized database based on a position of the first vehicle.

5. The method of claim 2, wherein one or more of the information on the state of the roadway, and the validation information of the information on the state of the roadway is transmitted between the vehicles via direct vehicle-to-vehicle communication or indirect vehicle-to-vehicle communication.

6. The method of claim 1, wherein the decentralized database is based on one or more of a distributed ledger technology and a directed acyclic graph.

7. The method of claim 6, comprising obtaining at least one part of the decentralized database based on a position of the first vehicle.

8. The method of claim 1, comprising obtaining at least one part of the decentralized database based on a position of the first vehicle.

9. The method of claim 1, wherein one or more of the information on the state of the roadway, and the validation information of the information on the state of the roadway is transmitted between the vehicles and/or the traffic infrastructure via direct vehicle-to-vehicle communication or indirect vehicle-to-vehicle communication.

10. The method of claim 1, wherein determining the trustworthiness of the information on the state of the roadway is carried out by the first vehicle.

11. The method of claim 1, comprising controlling the first vehicle based on the information on the state of the roadway if the trustworthiness of the information on the state of the roadway exceeds a threshold value.

12. The method of claim 11, wherein the threshold value is one or more of a user-selected threshold value, dependent on a type of the information on the state of the roadway, and dependent on a hazard potential of the information on the state of the roadway.

13. The method of claim 1, comprising determining a trustworthiness of one or more of the second vehicle, traffic infrastructure, and the one or more third vehicles based on the trustworthiness of the information on the state of the roadway.

14. The method of claim 13, comprising providing information on the trustworthiness of one or more of the second vehicle, traffic infrastructure, and of the one or more third vehicles to one or more other vehicles.

15. The method of claim 13, wherein the determination of the trustworthiness of the information on the state of the roadway is based on a previous trustworthiness of one or more of the second vehicle, traffic infrastructure, and of the one or more third vehicles.

16. The method of claim 1, wherein the validation information of the information on the state of the roadway is assigned to the information on the state of the roadway based on a comparison of a type of the information on the state of the roadway and of the validation information and based on a comparison of the location of the information on the state of the roadway and of the validation information on, or wherein the information on the validation of the information on the state of the roadway comprises a reference to the information on the state of the roadway, wherein the validation information of the information on the state of the roadway is assigned to the information on the state of the roadway based on the reference.

17. The method of claim 1, wherein the determination of the trustworthiness of the information on the state of the roadway is further based on information on a trustworthiness of sensor measurements of one or more of a vehicle type of the second vehicle, of the traffic infrastructure, and of the one or more third vehicles.

18. A non-transitory medium comprising instructions that when executed on a computer, a processor, or a programmable hardware component, causes the computer, the processor, or the programmable hardware component to conduct the method of claim 1.

19. The method of claim 1, comprising:

validating the information on the state of the roadway based on a sensor signal; wherein determining the trustworthiness of the information on the state of the roadway is additionally based on the validation of the information on the state of the roadway based on the sensor signal.

20. A device for a first vehicle, the device comprising:

at least one interface for exchanging information; and one or more processors configured to:

obtain information on a state of a roadway from a second vehicle or from traffic infrastructure;

obtain validation information on a validation of the information on the state of the roadway from one or more third vehicles, which validation information comprises weighing data, providing a measure for how many third vehicles confirm and/or reject the state of the roadway; and determine a trustworthiness of the information on the state of the roadway based on the validation information obtained from one or more third vehicles; wherein during determining of the trustworthiness of the information on the state of the roadway, the trustworthiness of the information on the state of the roadway is increased if the weighing data indicates that a vehicle of the one or more third vehicles confirms the information on the state of the roadway;

the trustworthiness of the information on the state of the roadway is reduced if the weighing data indicates that a vehicle of the one or more third vehicles rejects the information on the state of the roadway; and wherein the information on the state of the roadway and the validation information of the information on the state of the roadway is transmitted between the vehicles via a decentralized database.

* * * * *